United States Patent
Sorin et al.

(10) Patent No.: US 11,340,616 B2
(45) Date of Patent: May 24, 2022

(54) MOTION PLANNING FOR AUTONOMOUS VEHICLES AND RECONFIGURABLE MOTION PLANNING PROCESSORS

(71) Applicant: DUKE UNIVERSITY, Durham, NC (US)

(72) Inventors: Daniel J. Sorin, Durham, NC (US); George D. Konidaris, Durham, NC (US); William Floyd-Jones, Durham, NC (US); Sean Murray, Durham, NC (US)

(73) Assignees: DUKE UNIVERSITY, Durham, NC (US); BROWN UNIVERSITY, Providence, RI (US)

(*) Notice: Subject to any disclaimer, the term of this patent is extended or adjusted under 35 U.S.C. 154(b) by 0 days.

(21) Appl. No.: 16/308,693

(22) PCT Filed: Jun. 9, 2017

(86) PCT No.: PCT/US2017/036880
§ 371 (c)(1),
(2) Date: Dec. 10, 2018

(87) PCT Pub. No.: WO2017/214581
PCT Pub. Date: Dec. 14, 2017

(65) Prior Publication Data
US 2019/0163191 A1     May 30, 2019

Related U.S. Application Data

(60) Provisional application No. 62/451,816, filed on Jan. 30, 2017, provisional application No. 62/348,230, filed on Jun. 10, 2016.

(51) Int. Cl.
*G05D 1/02* (2020.01)
*G06F 16/901* (2019.01)
(Continued)

(52) U.S. Cl.
CPC ......... *G05D 1/0214* (2013.01); *G05D 1/0088* (2013.01); *G05D 1/0217* (2013.01);
(Continued)

(58) Field of Classification Search
None
See application file for complete search history.

(56) References Cited

U.S. PATENT DOCUMENTS 4,862,373 A   8/1989 Meng
4,949,277 A   8/1990 Trovato et al.
(Continued)

FOREIGN PATENT DOCUMENTS

EP   2306153 A2   4/2011
EP   3 250 347 A1   12/2017
(Continued)

OTHER PUBLICATIONS

Sean Murray et al., "The microarchitecture of a real-time robot motion planning accelerator", 2016 49th Annual IEEE/ACM International Symposium on Microarchitecture (Micro), IEEE, Oct. 15, 2016, 12 pages.
(Continued)

*Primary Examiner* — Peter D Nolan
*Assistant Examiner* — Demetra R Smith-Stewart
(74) *Attorney, Agent, or Firm* — Talem IP Law, LLP

(57) ABSTRACT

A system for motion planning for autonomous vehicles can include a plurality of sensors, a plurality of detectors in electrical communication with the plurality of sensors, and a motion planning module in electrical communication with the plurality of detectors and a computing system of an autonomous vehicle. The motion planning module stores a planning graph with each node representing, explicitly or implicitly, time and variables defining a state of the autonomous vehicle, an operating environment, or both the state of
(Continued)

the autonomous vehicle and the operating environment. A reconfigurable processor can include a collision detection module and, optionally, a shortest path module. Pre-computed collision data and planning graph data reflecting logical/physical node mapping can be communicated to the processor during a programming phase and used during runtime.

20 Claims, 7 Drawing Sheets

(51) Int. Cl.
*G05D 1/00* (2006.01)
*G01C 21/20* (2006.01)
*G08G 1/16* (2006.01)

(52) U.S. Cl.
CPC ....... *G05D 1/0274* (2013.01); *G06F 16/9024* (2019.01); *G01C 21/20* (2013.01); *G05D 2201/0213* (2013.01); *G08G 1/165* (2013.01); *G08G 1/166* (2013.01)

(56) References Cited

U.S. PATENT DOCUMENTS

| | | | |
|---|---|---|---|
| 5,347,459 | A | 9/1994 | Greenspan et al. |
| 5,544,282 | A | 8/1996 | Chen et al. |
| 6,049,756 | A | 4/2000 | Libby |
| 6,089,742 | A | 7/2000 | Warmerdam et al. |
| 6,259,988 | B1 | 7/2001 | Galkowski et al. |
| 6,493,607 | B1* | 12/2002 | Bourne .................. B25J 9/1666 414/744.3 |
| 6,539,294 | B1 | 3/2003 | Kageyama |
| 7,865,277 | B1 | 1/2011 | Larson et al. |
| 8,315,738 | B2 | 11/2012 | Chang et al. |
| 8,666,548 | B2 | 5/2014 | Lim |
| 8,825,207 | B2 | 9/2014 | Kim et al. |
| 8,855,812 | B2 | 10/2014 | Kapoor |
| 8,972,057 | B1 | 3/2015 | Freeman et al. |
| 9,102,055 | B1 | 8/2015 | Konolige et al. |
| 9,280,899 | B2 | 3/2016 | Biess et al. |
| 9,632,502 | B1* | 4/2017 | Levinson ................. G01S 17/87 |
| 9,645,577 | B1* | 5/2017 | Frazzoli ............ B60W 30/0956 |
| 9,687,982 | B1 | 6/2017 | Jules et al. |
| 9,687,983 | B1 | 6/2017 | Prats |
| 9,731,724 | B2 | 8/2017 | Yoon |
| 9,981,383 | B1 | 5/2018 | Nagarajan |
| 10,124,488 | B2 | 11/2018 | Lee et al. |
| 10,131,053 | B1 | 11/2018 | Sampedro et al. |
| 10,430,641 | B2 | 10/2019 | Gao |
| 10,705,528 | B2 | 7/2020 | Wierzynski et al. |
| 10,723,024 | B2 | 7/2020 | Konidaris et al. |
| 10,782,694 | B2 | 9/2020 | Zhang et al. |
| 2003/0155881 | A1 | 8/2003 | Hamann et al. |
| 2004/0249509 | A1 | 12/2004 | Rogers et al. |
| 2005/0071048 | A1 | 3/2005 | Watanabe et al. |
| 2005/0216181 | A1 | 9/2005 | Estkowski et al. |
| 2006/0235610 | A1 | 10/2006 | Ariyur et al. |
| 2006/0247852 | A1 | 11/2006 | Kortge et al. |
| 2007/0112700 | A1 | 5/2007 | Den Haan et al. |
| 2008/0125893 | A1 | 5/2008 | Tilove et al. |
| 2008/0234864 | A1 | 9/2008 | Sugiura et al. |
| 2009/0192710 | A1 | 7/2009 | Eidehall et al. |
| 2009/0295323 | A1 | 12/2009 | Papiernik et al. |
| 2009/0326711 | A1 | 12/2009 | Chang et al. |
| 2009/0326876 | A1 | 12/2009 | Miller |
| 2010/0235033 | A1 | 9/2010 | Yamamoto et al. |
| 2011/0066282 | A1 | 3/2011 | Bosscher et al. |
| 2011/0153080 | A1 | 6/2011 | Shapiro et al. |
| 2012/0010772 | A1* | 1/2012 | Pack .................... G05D 1/0274 701/27 |
| 2012/0083964 | A1 | 4/2012 | Montemerlo et al. |
| 2014/0025201 | A1* | 1/2014 | Ryu ..................... G05D 1/0217 700/245 |
| 2014/0025203 | A1 | 1/2014 | Inazumi |
| 2014/0121833 | A1 | 5/2014 | Lee et al. |
| 2014/0147240 | A1 | 5/2014 | Noda et al. |
| 2014/0249741 | A1 | 9/2014 | Levien et al. |
| 2014/0251702 | A1 | 9/2014 | Berger et al. |
| 2014/0309916 | A1 | 10/2014 | Bushnell |
| 2015/0051783 | A1 | 2/2015 | Tamir et al. |
| 2015/0261899 | A1 | 9/2015 | Atohira et al. |
| 2015/0266182 | A1 | 9/2015 | Strandberg |
| 2016/0001775 | A1 | 1/2016 | Wilhelm et al. |
| 2016/0107313 | A1 | 4/2016 | Hoffman et al. |
| 2016/0154408 | A1* | 6/2016 | Eade .................... G05D 1/0253 701/523 |
| 2016/0299507 | A1 | 10/2016 | Shah et al. |
| 2016/0357187 | A1* | 12/2016 | Ansari .................. G01S 13/862 |
| 2017/0004406 | A1* | 1/2017 | Aghamohammadi ....................... G06N 20/00 |
| 2017/0120448 | A1 | 5/2017 | Lee et al. |
| 2017/0132334 | A1* | 5/2017 | Levinson ................. G06F 30/20 |
| 2017/0146999 | A1 | 5/2017 | Cherepinsky et al. |
| 2017/0157769 | A1 | 6/2017 | Aghamohammadi et al. |
| 2017/0168485 | A1* | 6/2017 | Berntorp .............. G05D 1/0217 |
| 2017/0168488 | A1 | 6/2017 | Wierzynski et al. |
| 2017/0193830 | A1 | 7/2017 | Fragoso et al. |
| 2017/0305015 | A1 | 10/2017 | Krasny et al. |
| 2018/0001472 | A1 | 1/2018 | Konidaris et al. |
| 2018/0029233 | A1 | 2/2018 | Lager |
| 2018/0074505 | A1 | 3/2018 | Lv et al. |
| 2018/0136662 | A1 | 5/2018 | Kim |
| 2018/0281786 | A1 | 10/2018 | Oyaizu et al. |
| 2019/0164430 | A1 | 5/2019 | Nix |
| 2019/0232496 | A1 | 8/2019 | Graichen et al. |
| 2019/0293443 | A1 | 9/2019 | Kelly et al. |

FOREIGN PATENT DOCUMENTS

| | | |
|---|---|---|
| EP | 3486612 A1 | 5/2019 |
| JP | 11-249711 A | 9/1999 |
| JP | 11-296229 A | 10/1999 |
| JP | 2002-073130 A | 3/2002 |
| JP | 2006-224740 A | 8/2006 |
| JP | 2008-65755 A | 3/2008 |
| JP | 2009-116860 A | 5/2009 |
| JP | 2010-061293 A | 3/2010 |
| JP | 2011-75382 A | 4/2011 |
| JP | 2012-190405 A | 10/2012 |
| JP | 2012190405 A | 10/2012 |
| JP | 2012-243029 A | 12/2012 |
| JP | 2014-184498 A | 10/2014 |
| JP | 2015-517142 A | 6/2015 |
| JP | 2018-505788 A | 3/2018 |
| KR | 10-2011-0026776 A | 3/2011 |
| KR | 10-2017-0018564 A | 2/2017 |
| KR | 10-2017-0044987 A | 4/2017 |
| KR | 10-2017-0050166 A | 5/2017 |
| TW | 201318793 A | 5/2013 |
| WO | 99/24914 A1 | 5/1999 |
| WO | 2016/122840 A1 | 8/2016 |
| WO | 2017/214581 A1 | 12/2017 |
| WO | 2019/183141 A1 | 9/2019 |

OTHER PUBLICATIONS

Extended European Search Report Issued in European Application No. 18209405.2, dated Aug. 2, 2019, 10 Pages.
International Search Report and Written Opinion Issued in International Application No. PCT/US2019/023031, dated Aug. 14, 2019, 19 pages.
International Search Report and Written Opinion Issued in International Application No. PCT/US2019/016700, dated May 20, 2019, 14 pages.
Non-Final Office Action Issued in U.S. Appl. No. 15/546,441, dated Sep. 17, 2019, 52 pages.
International Search Report and Written Opinion Issued in International Application No. PCT/US2019/045270, dated Nov. 25, 2019, 13 pages.

(56) References Cited

OTHER PUBLICATIONS

Office Action Issued in Japanese Application No. 2018-564836, dated Dec. 3, 2019, 3 Pages.
Mike Stilman et al., "Manipulation Planning Among Movable Objects", Proceedings of the IEEE Int. Conf. on Robotics and Automation (ICRA '07), Apr. 2007, 6 pages.
David E. Johnson et al., "Bound Coherence for Minimum Distance Computations", Proceedings of the 1999 IEEE International Conference on Robotics & Automation, May 1999, 6 pages.
Merriam-Webster, "Definition of Or", Retrieved Sep. 9, 2019, 12 pages, https://www.merriam-webster.com/dictionary/or.
"International Search Report and Written Opinion Issued in International Application No. PCT/US17/36880", dated Oct. 10, 2017, 22 pages.
Kavraki et al., "Probabilistic Roadmaps for Path Planning in High-Dimensional Configuration Spaces," IEEE Transactions on Robotics and Automation, Aug. 1996, pp. 566-580, vol. 12, No. 4.
Hauck, Scott et al. "Configuration Compression for the Xilinx XC6200 FPGA," IEEE Transactions on Computer-Aided Design of Integrated Circuits and Systems, vol. 18, No. 8, Aug. 1998, 8 Pages.
Nuzhet, Atay and Bayazit, Burchan, "A Motion Planning Processor on Reconfigurable Hardware," Washington University, Dpartment of Computer Science & Engineering, Sep. 23, 2005, 13 Pages.
Rodriguez, Carlos et al. "Planning Manipulation movements of a Dual-Arm System Considering Obstacle removing," Robotics and Autonomous Systems, Elsevier Science Publishers, Amsterdam, NL, vol. 62, No. 12, Aug. 1, 2014, 11 Pages.
Atay et al., "A Motion Planning Processor on Reconfigurable Hardware," All Computer Science and Engineering Research, Sep. 23, 2005, 13 Pages, Report No. WUCSE-2005-46, Department of Computer Science & Engineering—Washington University in St. Louis, St. Louis, MO.
Second Office Action Issued In Japanese Patent Application No. 2017-557268, dated Feb. 26, 2019, 5 Pages.
International Search Report and Written Opinion Issued in PCT Application No. PCT/US2016/012204, dated Mar. 21, 2016, 10 Pages.
First Office Action Issued In Japanese Patent Application No. 2017-557268, dated Aug. 7, 2018, 15 Pages.
Extended European Search Report Issued in European Application No. 16743821.7, dated Apr. 10, 2018, 9 Pages.
Invitation to Pay Additional Fees and, Where Applicable, Protest Fee Issued in PCT/US17/36880, dated Aug. 14, 2017, 2 pages.
Extended European Search Report Issued in European Application No. 17811131.6, dated Apr. 24, 2019, 16 Pages.
Sean Murray et al., "Robot Motion Planning on a Chip", Robotics: Science and Systems 2016, Jun. 22, 2016, 9 pages.
International Search Report and Written Opinion Issued in PCT/US2019/012209, dated Apr. 25, 2019, 26 pages.
International Search Report and Written Opinion issued in PCT/US2019/064511, dated Mar. 27, 2020, 12 pages.
Office Action Issued in Japanese Application No. 2018-564836, dated May 19, 2020, 3 Pages.
Non-Final Office Action Issued in U.S. Appl. No. 16/268,290, dated Jan. 27, 2021, 54 pages.
International Search Report and Written Opinion issued in International Application No. PCT/US2020/034551, dated Aug. 31, 2020, 16 pages.
International Search Report and Written Opinion issued in International Application No. PCT/US2020/039193, dated Sep. 29, 2020, 7 pages.
Non-Final Office Action issued in U.S. Appl. No. 16/240,086, dated Feb. 11, 2021, 57 pages.
Non-Final Office Action Issued in U.S. Appl. No. 16/268,290, dated Jun. 17, 2021, 35 pages.
Final Office Action issued in U.S. Appl. No. 16/240,086, dated Aug. 2, 2021, 88 pages.
Office Action issued in Taiwanese Application No. 106119452, dated Jun. 16, 2021, 19 pages.
Reconsideration Report by Examiner before Appeal issued in Japanese Application No. 2018-564836, dated Jun. 2, 2021, 2 pages.
Extended European Search Report issued in European Application No. 19851097.6, dated Jul. 23, 2021, 15 pages.
J. A. Corrales et al. "Safe human-robot interaction based on dynamic sphere-swept line bounding volumes" Robotic and Computer-Integrated Manufacturing, 2011, 27, 9 pages.
Angel P. Del Pobil et al. "A New Representation for Collision Avoidance and Detection" Proceedings of the 1992 IEEE International Conference on Robotics and Automation, May 1992, 7 pages.
Yuichi Sato et al. "Efficient Collision Detection Using Fast Distance-Calculation Algorithms for Convex and Non-Convex Objects" Proceedings of the 1996 IEEE International Conference on Robotics and Automation, Apr. 1996, 8 pages.
Alexander Martín Turrillas, "Improvement of a Multi-Body Collision Computation Framework and its Application to Robot (Self-) Collision Avoidance" German Aerospace Center (DLR) Institute of Robotics and Mechatronics, Master's Thesis, Jun. 1, 2015, 34 pages.
Notice of Allowance issued in U.S. Appl. No. 16/240,086, dated Dec. 24, 2021, 28 pages.
"Motion Planning" 2009, 37 pages.
Jia Pan et al. "Efficient Configuration Space Construction and Optimization for Motion Planning" Engineering, Mar. 2015, vol. 1, Issue 1, 12 pages.
Chao Chen "Motion Planning for Nonholonomic Vehicles with Space Exploration Guided Heuristic Search" 2016, 140 pages.
International Search Report and Written Opinion issued in International Application No. PCT/US2020/047429, dated Nov. 23, 2020, 9 pages.
Notice of Allowance issued in U.S. Appl. No. 16/268,290, dated Sep. 24, 2021, 8 pages.

\* cited by examiner

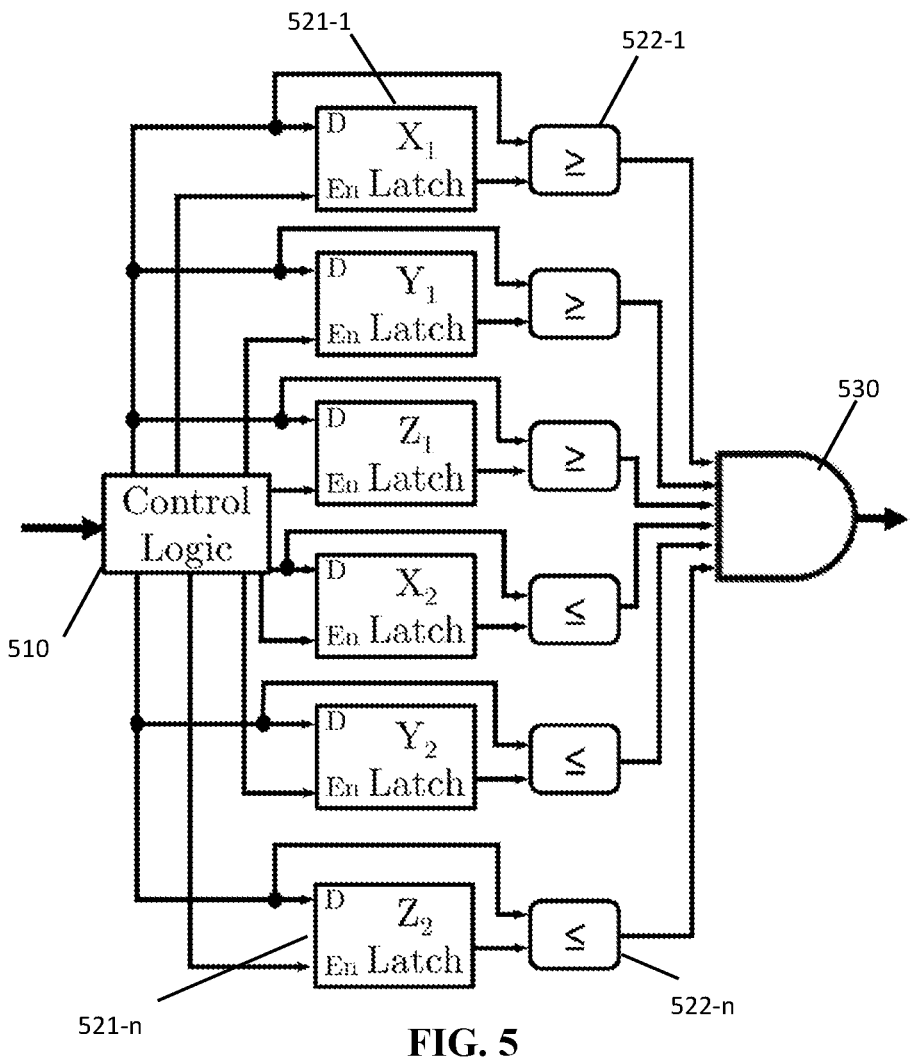
FIG. 5
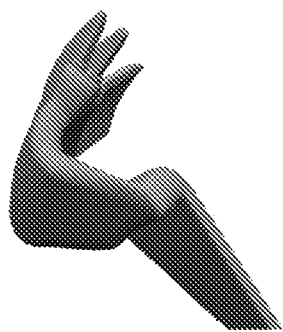 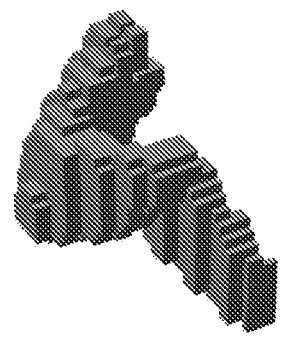 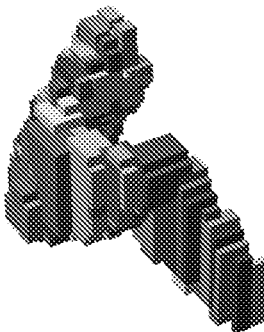 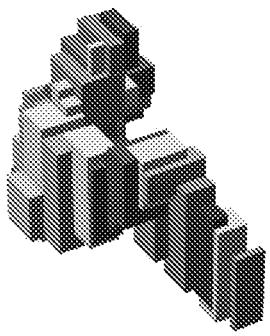
FIG. 6A     FIG. 6B     FIG. 6C     FIG. 6D

MOTION PLANNING FOR AUTONOMOUS VEHICLES AND RECONFIGURABLE MOTION PLANNING PROCESSORS

CROSS-REFERENCE TO RELATED APPLICATIONS

The present application is the U.S. National Stage Application of International Application No. PCT/US17/36880, filed Jun. 9, 2017, which claims the benefit of U.S. Provisional Application Ser. No. 62/348,230, filed Jun. 10, 2016, and U.S. Provisional Application Ser. No. 62/451,816, filed Jan. 30, 2017, which are hereby incorporated by reference in their entirety, including any figures, tables, and drawings.

GOVERNMENT SUPPORT

This invention was made with government support under Grant number HR0011-15-A-00020007 awarded by Defense Advanced Research Projects Agency (DARPA). The government has certain rights in the invention.

BACKGROUND

Motion planning is the process of determining how a robot should maneuver in the real world. It is the process of finding a collision-free path from a robot's starting position to a goal state. For example, a robot may wish to move its arm to reach a desired object without colliding with itself or any other object. The ability to perform motion planning to navigate and manipulate objects is critical to dealing with natural environments that are not heavily controlled or engineered. The robot first perceives information about the physical world around it, and then the computer determines how to control the physical robot so that the robot can navigate in this perceived environment.

Motion planning at both high speed and low power is an important and challenging task for many technologies, including autonomous vehicles. Challenges for autonomous vehicles include the ability to avoid collisions with both static (e.g., booms or things left in the road) and dynamic (e.g., bicyclists, pedestrians, or other cars) obstacles, the ability to replan at high frequency, and the ability to deal with the uncertainty about how dynamic obstacles may move.

In many situations, a major constraint of robots, including autonomous vehicles, is their ability to perform real-time motion planning in environments with obstacles. Motion planning algorithms tend to be computationally intensive, requiring a vast number of collision checks for each movement.

BRIEF SUMMARY

Specialized robot motion planning hardware for autonomous vehicles are provided. In addition to the systems and devices for motion planning for autonomous vehicles and other robots, a reconfigurable processor is described that can implement the various specialized robot motion planning hardware for autonomous vehicles and other robots. The reconfigurable processor can perform the motion planning for a particular robot and/or particular scenario and then be reconfigured to solve the motion planning for a different robot and/or scenario. The described specialized robot motion planning hardware can perform motion planning operations of solving collision detection and/or finding a shortest path entirely in hardware circuitry or as software executed by a hardware processor, or as a combination of hardware circuitry and software executed by a hardware processor. The hardware and/or software functionality can be considered embodied by a "motion planning module."

A system for motion planning for autonomous vehicles can include a plurality of sensors, a plurality of detectors in electrical communication with the plurality of sensors, and a motion planning module in electrical communication with the plurality of detectors and a computing system of an autonomous vehicle. The motion planning module stores a planning graph with each node representing, implicitly or explicitly, time and variables defining a state of the autonomous vehicle, an operating environment, or both the state of the autonomous vehicle and the operating environment. The motion planning module receives perception data and sample trajectories from the plurality of detectors, adjusts a probability of collision along each edge in the planning graph that results in a collision with obstacles in the perception data to account for the sample trajectories, determines a path considering cost and probability of collision, and outputs the path to the computing system. The plurality of detectors can include an object detector and an obstacle tracker. A cost grid can be included that receives an obstacle location from the object detector as given by a stream of voxels, and assigns each voxel a cost modifier, which is then sent to the motion planning module.

The motion planning module can include a hardware processor and memory storage. The memory storage can store a planning graph, such as a lattice or other probability road map, that was generated offline prior to real-time motion planning. In some cases, the motion planning module includes hardware collision detection units to perform parallel collision detection. In some cases, the motion planning module includes reconfigurable collision detection acceleration. The precomputed collision data can be stored at a memory storage of the motion planning module such that during motion planning, as perception data is received, the perception data is compared by a hardware processor of the motion planning module to the precomputed collision data stored in the memory storage to determine collisions.

During run-time operation, the edges of the planning graph can be assigned information of one or more variables. One variable can be cost and the second variable can be risk. The cost information can be obtained from a cost grid associated with object detection (static and, optionally, moving objects with calculatable trajectories) in the environment. The risk information can be obtained from sampling the output of the object tracker. Then, the motion planning module generates a path considering cost and risk, representing a legal motion plan, and outputs the motion plan so that a robot can effectuate motion in accordance with the motion plan.

The motion planning module can be programmed for a wide range of robots and expected task scenarios. The motion planning module can be reused, or reprogrammed, for different robots (i.e., reconfigurable) or the motion planning module can be designed for a specific robot. One type of robot can be an autonomous vehicle.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 5 shows an example collision detection architecture for a strategy using boxes instead of voxels.

FIGS. 6A-6D illustrate how the representation of the swept volume for a single motion in a PRM changes with representation strategies. FIG. 6A shows the actual swept volume. FIG. 6B includes all the individual voxels for the motion. FIG. 6C shows the same swept volume described using 87 boxes instead of individual voxels. FIG. 6D shows the volume covered by only 38 boxes if a 10% volume increase is allowed.

DETAILED DESCRIPTION

Figure 1:
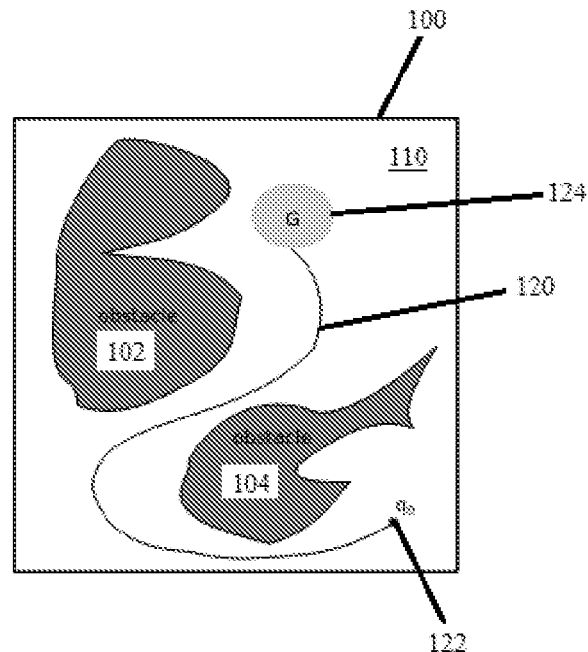
FIG. 1 shows an example illustration of a motion planning problem in a generally static environment.

Specialized robot motion planning hardware for autonomous vehicles are provided. The robot motion planning hardware for autonomous vehicles involves risk-aware robot motion planning. In addition to the systems and devices for motion planning for autonomous vehicles and other robots, a reconfigurable processor is described that can implement the various specialized robot motion planning hardware for autonomous vehicles and other robots. The reconfigurable processor can perform the motion planning for a particular robot and/or scenario and then be reconfigured to solve the motion planning for a different robot and/or scenario.

As used herein, "scenario" refers to a class of environments, such as "desk with objects on it" or "bookshelf with objects on it". A scenario includes distributions of the number of obstacles and their locations, sizes, and shapes. A scenario also includes distributions of robot starting poses and goal poses with positions of various robot parts. At any given time, the robot needs to perform motion planning for one task drawn from one scenario. For example, if the scenario is "3-foot high desk with objects on it"—with given distributions of the number of obstacles, obstacle locations, obstacle sizes/shapes, and robot start and goal poses—it is expected that the robot does not need to be able to move its arm beneath the table. As another example, in many scenarios, it is unlikely that the robot needs to be able to move its arm behind itself. This a priori knowledge of the scenario conserves resources (and dedicates more hardware) for solving the expected motion planning problems. If more than one scenario is possible in a given environment, then a composite scenario that is effectively the union of the possible scenarios is utilized or the robot motion planning hardware is reconfigured when the scenario changes.

As used herein, a "vehicle" refers to any mobile machine that can travel over ground, over or within water, in the air, or any combination thereof. Examples of ground vehicles include trains, busses, cars, trucks, motorcycles, and mopeds. Examples of water vehicles include submarines, boats, and recreational watercraft. Examples of air vehicles include drones, airplanes, helicopters, and quadrotors. Ground vehicles, water vehicles, and air vehicles are all considered to be within the scope of "vehicle" so long as the vehicle is powered and can be autonomously controlled. An autonomous vehicle is a special case of "robot" and therefore aspects described herein with respect to a "robot" can be implemented for autonomous vehicles depending on application. It should be understood that reference to "autonomous" does not require full autonomy and can include semi-autonomous vehicles.

As used herein "risk-aware" refers to the inclusion of probabilistic estimates of future trajectories of dynamic obstacles that may appear with some uncertainty in an operating environment of the vehicle or other robot.

A voxel is a representation of an obstacle (and which may be a collection of voxels). In some implementations, a voxel is defined as a point in the space (x, y, z), and optionally t, where x, y, and z are coordinates defining a point in space and t is a value representing, implicity or explicity, time that an obstacle is in that space. Implicit time refers to parameters that reflect time, but do not have to directly indicate the time. An example of implicit time is the number of hops from the beginning point. Explicit time refers to a value that directly indicates time—whether tied to actual time or indicated as increments of time, e.g., in seconds, from a start time). A static obstacle is, therefore, an obstacle where the (x, y, z) points are the same for all t in [0, H]. In some cases, one or more additional variables may be included in a voxel (along with or replacing any or all of the x, y, z, and t values). These variables include any suitable information related to state of a robot/vehicle and/or its environment. Examples include, but are not limited to, humidity, rain, slope, velocity, acceleration, azimuth, and angle.

In some implementations, instead of voxels, obstacles may be represented by a mesh model made from any type of polygon, for example, triangles, where each vertex of a triangle is described with its 3D coordinates.

The described specialized robot motion planning hardware can perform motion planning operations of solving collision detection and/or finding a shortest path entirely in hardware circuitry or as software stored in a memory storage and executed by a hardware processor, or as a combination of hardware circuitry and software stored in the memory storage and executed by the hardware processor. The hardware and/or software functionality can be considered to embody a "motion planning module."

As mentioned in the background, motion planning refers to the processes used to identify the motions a robot will undergo in order to move from one position to another position until the robot achieves a desired position. For an articulated robot, which is formed of a set of rigid bodies connected by joints, motion planning determines the movement from one pose to another pose until a goal pose is met. For vehicles, which may or may not have multiple dimensions and freedom to operate, motion planning determines the movement from one position or pose to another position or pose in a similar manner as an articulated robot with more or fewer positions to be assigned as part of the robot's configuration space.

For example, the pose of an articulated robot can be described by assigning positions to all of its joints. The space of all such joint positions is called the robot's configuration space, or "C-space", denoted as Q. Some configurations (of the joint positions) in Q would result in a collision with an obstacle in the robot's environment or the robot's own body; the remainder of Q is referred to as "free space". Thus, the robot motion-planning problem can be considered to entail finding a collision-free path through free space from some start configuration $q_0$ to any configuration g within a set of goal configurations, G.

FIG. 1 shows an example illustration of a motion planning problem in a generally static environment. Referring to FIG. 1, a C-space (the robot's configuration space) 100 can include obstacle collision regions 102, 104 and free space 110. A path 120 can be found through the free space 110 from a start configuration 122 ($q_0$) to a configuration within the set of goal configurations 124 ($g \in G$).

For the vehicle embodiment, in addition to the static obstacles, which may form the obstacle collision regions 102, 104, other obstacles are relevant, in particular dynamic obstacles, including those representing objects that move in known/certain trajectories (e.g., a falling brick, a rolling can) and those that are controlled by a conscious being (e.g., a bicyclist, pedestrian, bird). In the case of autonomous vehicles, challenges to motion planning due to these dynamic obstacles involve the ability to perform motion planning at very fast speeds and the ability to analyze the uncertainty of how dynamic objects may move. The environment surrounding an autonomous vehicle can change rapidly, and the vehicle's ability to perform motion planning must keep up with those changes.

There are typically four main components involved with creating a motion plan: perception, planning graph construction, collision detection, and path search.

The perception component involves the use of a combination of sensors and processing to produce a model of the environment. Perception can be carried out by any suitable computer vision and sensing architecture. In general, the model of the environment can be considered to be in the form of an occupancy grid, which is a data structure representing which regions of the space contain obstacles in a discretized view of the environment.

The planning graph construction component involves the creation of a graph of poses and motions in a robot's configuration space. In some cases, each node in the graph completely defines the state of the robot in a specific pose, and each edge defines a motion between poses. In some cases, such as useful for autonomous vehicle embodiments, the planning graph construction component involves a set of variables relevant to the behavior of the vehicle combined with, implicitly or explicitly, time. That is, in one implementation, the similar parameters as the articulated robot embodiment (e.g., spatial coordinates x, y, and optionally z) along with the implicit or explicit time can define a node. In other implementations, angle (theta), velocity, acceleration, or other parameters of interest may be included in place of or in addition to one or more of the spatial parameters. The planning graph construction is performed offline (i.e., prior to real time motion planning).

The collision detection component involves determining if a motion of a robot is in collision with itself or the environment. A portion of the collision detection is performed offline. This portion can include precomputed collision data. The graph generated as part of the planning graph construction is modified during the offline portion of the collision detection, with the resulting output of a planning graph. A planning graph can be, but is not limited to, a probabilistic roadmap (PRM), PRM*, a rapidly exploring random tree graph (RRT), RRT*, or a lattice.

The path search component can involve traversing the planning graph to check if a path from the starting position to the goal exists and to identify one or more optimal or otherwise desirable paths.

The planning graph construction, collision detection, and path search can be accelerated through the techniques described herein, and, in some embodiments, be implemented in a reconfigurable fashion.

Figure 2:
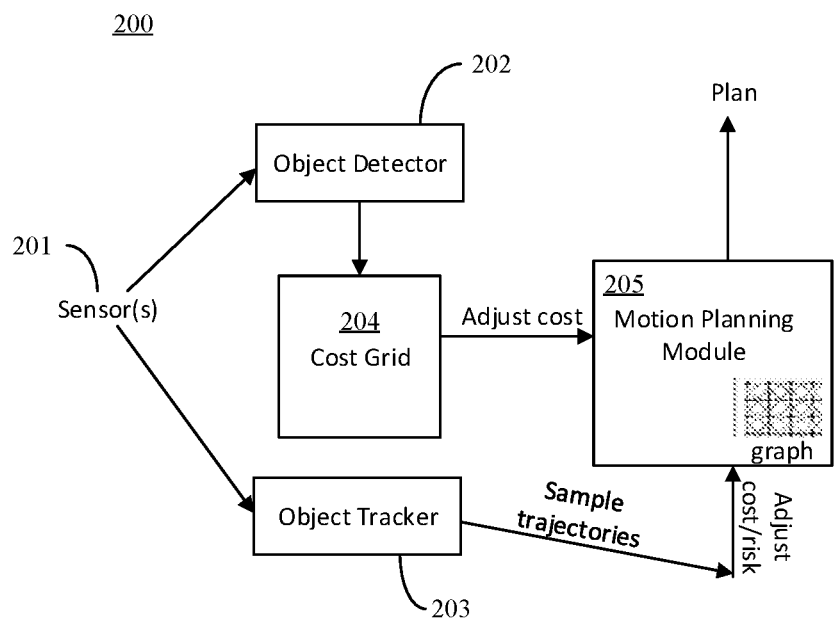
FIG. 2 shows an example of a real-time system for motion planning of an autonomous vehicle.

FIG. 2 shows an example of a real-time system for motion planning of an autonomous vehicle. Referring to FIG. 2, system 200 includes sensors 201, an object detector 202, an object tracker 203, a cost grid 204, and a motion planning module 205.

The sensors 201 can be any suitable sensors for a robot. Examples of sensors include light/photo (including IR), sound (e.g., reflection-based), chemical, directional, and position (e.g., global positioning system). It should be understood that the environment captured and analyzed by the robot is not necessarily the environment only in a direct path between the robot's current position and a goal position. A robot may have a valid path only in a circuitous route (and that path may not even be in a total line of sight of the goal pose or state). The robot can include or communicate with any of a variety of sensor systems through which an environment can be detected and analyzed. For example, the robot can have one or more camera sensors capable of receiving red, green, blue, and depth information (e.g., via infrared). As another example, cameras (or other sensors) may be located at one or more positions in the environment such as on walls, ceilings, floors and/or objects in the environment (like on a table, box, etc.) and/or in space (e.g., satellite, drone). Environmental information captured from the sensor(s) in the environment can be transmitted to the robot (and/or the object detector 202 and/or object tracker 203) via wired or wireless means.

The object detector 202 uses input from one or more of the sensors 201 to determine object information. The object detector 202 can be used to determine whether there is an obstacle from the sensor data. The object detector 202 can be used to identify static objects and may also include functionality (via hardware or software) for detecting moving objects that have a certain/calculatable path (e.g., a falling brick). For a vehicle that uses a road, the object detector 202 can be a road detector that identifies the position of the known static obstacles on the road (and which may include objects identified from the vehicle's position with respect to a road map).

The object tracker 203 uses input from one or more of the sensors 201 to identify a dynamic object and output a probability distribution of future trajectories over time for each identified object. The object tracker 203 is used to detect and track obstacles with uncertain movement. For example, the object tracker 203 may identify from data from one or more of the sensors 201 that there is another car on the road (the identified dynamic object). The output of the object tracker 203 with respect to the car may indicate, at a given time on the one or more associated trajectories, that there is a 10% likelihood of that dynamic object swerving in front of the autonomous vehicle and a 90% likelihood of that dynamic object slowing down (due to, for example, an upcoming stop sign).

The sensors 201, object detector 202, and, in some cases, aspects of the object tracker 203 may be considered part of the perception element for motion planning.

The cost grid 204 (or "cost map") includes a data structure that can be used to represent obstacles. The cost grid 204 can be used to include information on preferences for certain activities and/or locations as well as identify particular objects in the environment. Formats of object representations by the cost grid 204 may include values of a voxel, a mesh model made from triangles, where each vertex of a triangle is described with its 3D coordinates, a probabilistic occupancy grid, or an octomap, as some examples.

In an example implementation for an autonomous vehicle, the cost grid 204 can generate a cost map from features around the vehicle ("a road-specific cost map"). For example, for a car, there can be preferences for staying in the middle of the lane, for not moving into the lane for traffic moving in the opposite direction, for fewer rather than more lane changes and the like. In addition, road features, such as curvature and pot holes may be taken into consideration. The cost grid 204, therefore, would generate a cost map from the road features around the car, which is similar to an occupancy grid, but where each voxel carries a cost modifier. As an illustration, if the road is directly ahead, there is an emergency lane to the right, and a lane in the other direction to the left, then the grid would have a stripe of low-cost (or even negative cost) voxels in it, a stripe of higher cost voxels to its right, and a stripe of very high cost voxels to its left. Similarly, where there are curves in the road, the cost modifier for areas off the road would be indicated as higher cost to minimize the car going off-road. Cost modifiers can be assigned to minimize lane changes as well. Each voxel of the cost grid 204 for a road may include x and y coordinates, but not require time as a value. The voxel could include information such as velocity in order to support expressing preferences with respect to speed limits. Of course, other parameters may be used as desired.

The motion planning module 205 receives the voxels and assigned costs from the cost grid 204 corresponding to detected objects and samples trajectories from the estimates output from the object tracker 203 of identified dynamic objects to generate a motion plan for the vehicle (which can be carried out by appropriate hardware of the autonomous vehicle) or other robot. The motion planning module 205 includes a hardware processor and memory storage. The type of memory employed can be any suitable storage media such as dynamic random access memory, flash memory, magneto-electric memory, magneto resistive memory, optical-based memory, and the like.

A planning graph is stored in the memory storage. As mentioned above, the planning graph can be a lattice, PRM, PRM*, or other suitable graph. The hardware processor at the motion planning module 205 samples the trajectories output at the object tracker 203 to adjust the cost/risk. In other words, the motion planning module 205 adjusts a probability of collision, which can include a cost and/or risk value, along each edge of the graph to account for the sample trajectories. The sample trajectories can be mapped to voxels (or other representations of an obstacle) and used to perform collision detection. Thus, this motion planning hardware is a risk-aware motion planning hardware.

In an example, the motion planning module 205 samples the trajectories from the probabilistic estimate of the future trajectory of each dynamic obstacle and performs collision detection with each sample. Edges in collision can increment their estimated probability of being in collision. If there are 200 samples, a collision on each trajectory adds $1/200$ to the probability collision for an edge. This value is stored as part of that edge of the planning graph and used during performing a shortest path algorithm (for example of a reconfigurable and hardware implemented shortest path module see description of using Bellman-Ford algorithm). The values can be stored at the motion planning module 205 associated with the edges of the planning graph.

The collision detection may in some cases involve using methods such as, but not limited to, those described in PCT/US2016/012204, "Specialized Robot Motion Planning Hardware and Methods of Making and Using Same," filed Jan. 5, 2016, which is hereby incorporated by reference in its entirety.

An example process carried out by the motion planning module is provided as follows.

The motion planning module 205 generates a motion plan that balances the risk of collision with other obstacles versus the efficiency of reaching a goal location by calculating, and then assigning, a risk for every edge in the planning graph. The edges of the planning graph stored at the motion planning module 205 that would result in collision with certainty (e.g., those static obstacles) may either be removed or assigned a risk. In many practical applications for autonomous vehicles, the edges remain but are assigned a risk (which may be very small/negligible or very large/maximum assigned value). The risk assigned to edges can be based on predefined risk values for static objects (e.g., 100%). To ensure a high probability of being collision free with uncertain obstacles, the motion planning module 205 can sample over the distribution of trajectories from the probabilistic estimate and calculate a probability of collision with each edge in the planning graph.

After the motion planning module 205 samples the trajectories and determines the probability of a collision for the edges (based on the risk assigned to the edges), the motion planning module determines the "shortest" path to a target location by considering cost and probability of collision. For example, the fastest way to get to a goal location may be to speed past a bicyclist going straight, but that path may have a 2% chance (e.g., estimate of collision) of knocking over the bicyclist, which is a high cost (poor/bad decision). Other path options may include going around the bicyclist. As another example, hitting a garbage can is less costly than hitting a dog, even if the probability of hitting the garbage can is greater. Therefore, the effective cost of hitting the garbage is far less than hitting the dog. If the probability of collision is 100%, then the effective cost is at a maximum. In another example—for a case of using a risk constraint, if a probability of collision needs to be less than 5% per trajectory, a search can be performed that finds the minimum path cost with the constraint of less than 5% probability of collision. If instead a cost function that trades off risk vs. efficiency is desired, then the motion planning module can compute a modified cost using the two terms and then run a shortest path algorithm. This path is output from the motion planning module 205 and sent to the robot to move accordingly.

In general, with a moving robot, every path may have some probability of collision, otherwise the vehicle should remain stationary. However, remaining stationary is not generally a reasonable option for a vehicle. Most drivers may instead, for example, adopt a threshold of 0.1% risk of collision as suitably sufficient when balanced with efficiency. The robot, or in this case, autonomous vehicle, designer can choose the particular tradeoff. The motion planning module 205, knowing the tradeoff, can compute the shortest path.

By balancing, or at least considering, risk vs. efficiency, the motion planning module 205 provides risk-aware motion planning. In one embodiment, given a set of desired goal positions at time H (or, a preference over positions at time H) the motion planning module 205 may comprise (a) removing an edge, or adding cost or risk to each edge based on possible collisions; (b) removing, or adding, cost to each edge based on the layout of the road; and/or (c) computing a plan using least cost, plus possibly a risk constraint.

During run time, the cost, and the probability of that cost occurring, will change. Thus, the motion planning performed by the motion planning module 205 can be iterative in nature. That is, replanning may comprise the steps of making a plan, making a single movement, and then repeating the motion planning process again. In this case, it is very useful to root the lattice (or other planning graph) at the origin of the vehicle to maintain consistency (and also the resolution can be reduced for the plan because the vehicle is getting closer to an obstacle).

The described system 200 can be implemented as part of a vehicle that includes an on-board computer processor and electrically and/or mechanically connected actuation systems that can carry out adjustments to the vehicle systems (e.g., brakes, engine, steering, etc.). Storage systems can be included as well as power supplies and/or connections to power the various components. Sensors 201 may be part of a sensor system through which an environment can be detected and analyzed. Example sensor systems include, but are not limited to, optical, microwave, acoustic and other sensors in the form of video cameras, image sensors, infrared sensors, ultrasound transceivers, microphones, force sensors, capacitive sensors, accelerometers, gyroscopes, and temperature sensors. Sensor system can include hardware for some processing of a signal from a sensor and/or control of that sensor. Sensor system can include components that may be local to the vehicle and components that may be remote from the vehicle. For example, in some cases sensor system may include sensors that can be located in an environment, the output of which may be analyzed locally at the vehicle or analyzed remote from the robot and communicated to the robot for use in motion planning (among other applications that can be available).

The on-board computer processor may be separate from or the same processor or processing system used for the motion planning module 205 and/or any of the processors used by the object detector 202 and object tracker 203. A processing system can include one or more processors to transform or manipulate data according to the instructions of software stored on the storage systems of the vehicle and/or motion planning module 205 (and/or other components of the system 200). Examples of processors of the processing system include general purpose central processing units, application specific processors, logic devices, and graphic processing units (GPUs), as well as any other type of processing device, combinations, or variations thereof. The processing system may be, or is included in, a system-on-chip (SoC) along with one or more other components such as network connectivity components, video display components, and the like. Furthermore, aspects of the motion planning module 205, including the collision detection and/or the shortest path determination, may be implemented in hardware (which may support reconfigurability).

A storage system includes storage media in the form of physical storage devices. The term "storage media" should not be defined as a transitory or propagating signal. The storage systems of the vehicle may include additional elements, such as a controller, capable of communicating with the processing systems.

A motion planning module—simple (i.e. that does not include risk awareness) or risk aware—can be reconfigurable for a wide range of robots and motion planning applications, or can be robot and scenario specific.

It can be appreciated that a collision detection unit of a motion planning module can be generated by generating a PRM (or other planning graph) using a robot description (for example collision geometry of the robot, degrees of freedom for each joint of the robot, and joint limits of the robot) and a scenario description; and then identifying all possible edges in the PRM that can collide with each part of an obstacle (known obstacles and the parts of the robot itself). For a hardwired solution, a logic circuit can be generated, for example an OR circuit for each edge that ORs representations of the parts of obstacles to which that edge can collide. For a reconfigurable solution, the logic circuit can be implemented in reconfigurable architecture (e.g., FPGA) or stored as a software representation applied by a hardware processor of the motion planning module. Alternatively, a listing of the edges can be stored and searched by a hardware processor of the motion planning module.

Once hardwired or stored at the motion planning module, the motion planning module can be used by a robot to perform real-time motion planning.

Figure 3:
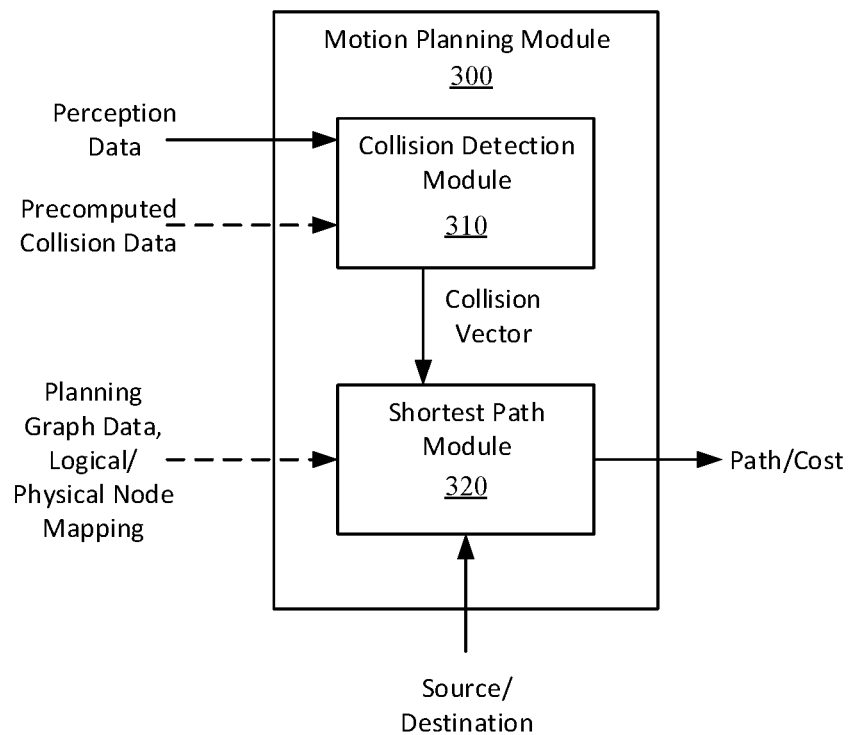
FIG. 3 illustrates an example architecture of a motion planning module according to certain embodiments of the invention.

FIG. 3 illustrates an example architecture of a motion planning module according to certain embodiments of the invention. Referring to FIG. 3, a motion planning module 300 can include a collision detection module 310 and a shortest path module 320. One or both of the collision detection module 310 or shortest path module 320 can be reconfigurable.

Some implementations of the motion planning module 300 can use software-based shortest path algorithms without the hardware architecture for shortest path acceleration. A programming phase allows a user to configure, and reconfigure, a device for the problem of interest. Precomputed collision data for the specific robot and planning graph involved is sent to a chip's motion planning module 300 (the dotted arrows indicating communication that happens during programming phase while the solid lines indicating communication that happens during the runtime phase).

When the shortest path module 320 is implemented with hardware, the topology of the planning graph is also mapped onto a reconfigurable fabric of hardware units to enable rapid determination of the shortest path. The mapping step involves programming each physical node with the addresses and edge weights of its logical neighbors. This allows the architecture to be reconfigurable to different planning graph topologies.

Advantageously, the shortest path hardware as described herein can be utilized in applications other than motion planning. Therefore, it is contemplated that the shortest path module can be applied to other applications.

Returning to FIG. 3, during the runtime phase, the host (e.g., robot system) sends perception data to the motion planning module 300. The perception data is a stream of which voxels are present in the current environment. The collision detection module 310 calculates which motions are safe and upon completion sends the results to the shortest path module 320 (without further host-device communication). The collision detection module 310 modifies the planning graph accordingly by eliminating edges in collision. The shortest path module 320 then runs and returns a path, P, to the host.

The user can store various configuration files relevant to different robot/planning graph combinations. Upon switching to a new combination, the device is reprogrammed by, for example, providing precomputed collision data to the reconfigurable implementation of collision detection module 310 and optionally planning graph data and logical/physical node mapping to the reconfigurable implementation of shortest path module 320.

The collision detection module 310 can include a hardware processor; memory storage; and precomputed collision data stored at the memory storage such that during motion planning, as perception data is received, the perception data is compared by the hardware processor to the precomputed collision data stored in the memory storage to determine collisions.

Figure 7:
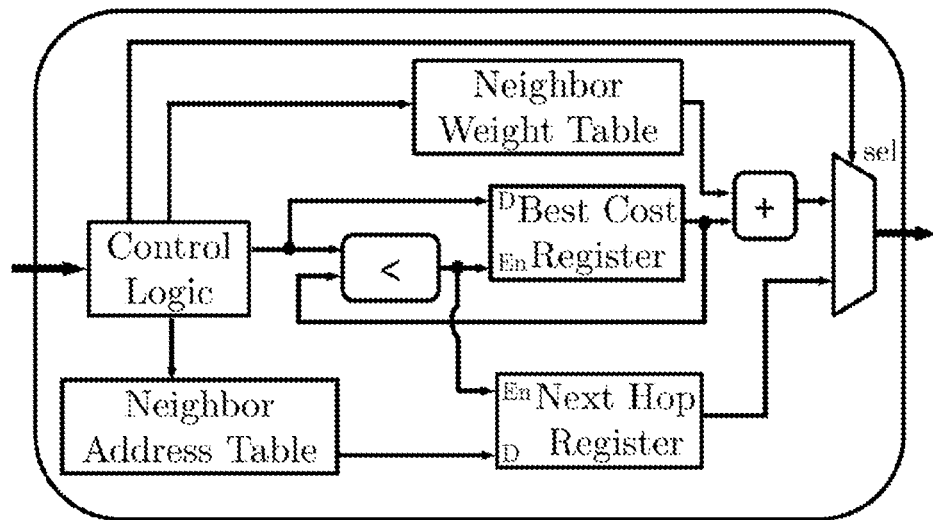
FIG. 7 shows a basic microarchitectural layout of the Bellman Ford Compute Unit for an example implementation.
Figure 8:
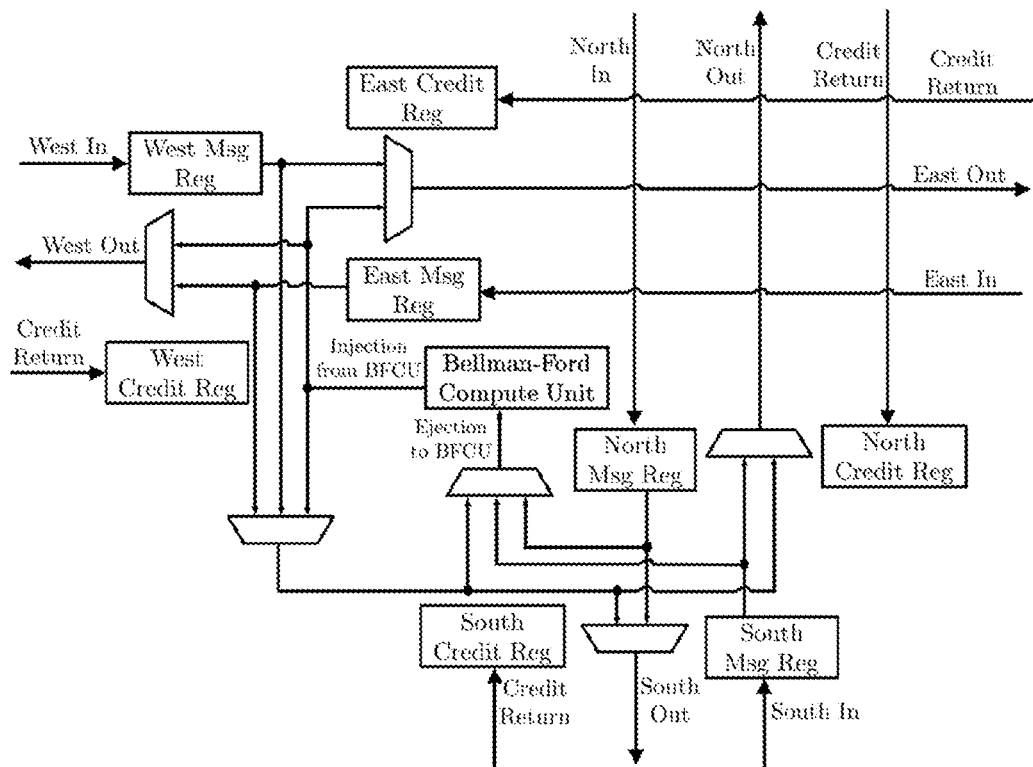
FIG. 8 shows an example router microarchitecture for an on-chip network for the example implementation.
Figure 9:
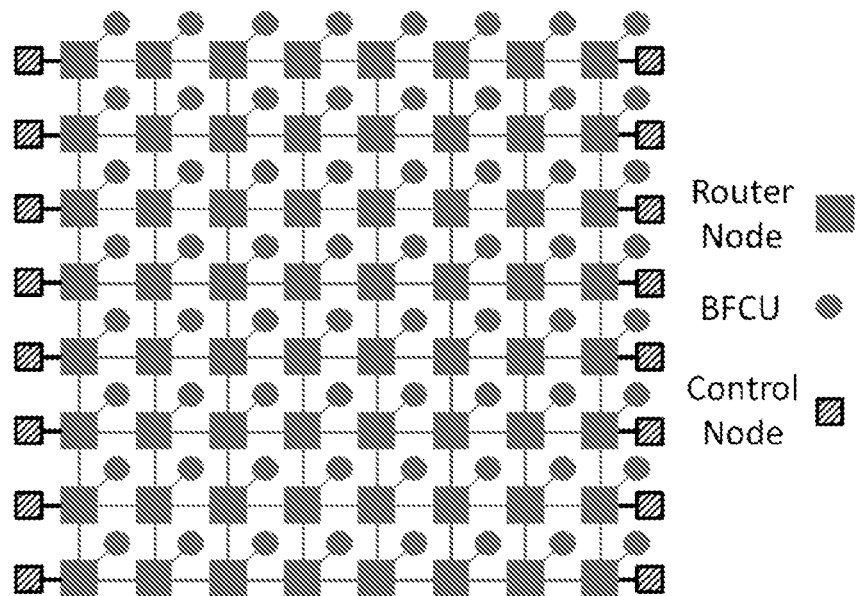
FIG. 9 shows a plan view of an interconnection network for an example implementation.

The shortest path module 320 can include parallel hardware units implementing a shortest path algorithm (see e.g., example shown in FIG. 7); and circuitry mapping logical topologies onto a physical topology of the parallel hardware units to identify logical neighbor (see e.g., FIGS. 8 and 9). For motion planning, the shortest path module 320 receives the determined collisions to output a plan.

An example method of operating a reconfigurable motion planning module can include performing a first programming phase to program the module for a particular robot and particular scenario, performing the motion planning using the programmed motion planning module, and then reconfiguring the motion planning module by performing a second programming phase to program the module for a new particular robot and/or new particular scenario. That reconfigured module can then be used for motion planning.

Example Reconfigurable Architecture for Robot Motion Planning Acceleration

This architecture can be applied to the embodiment of an autonomous vehicle, or any general robot. It should be noted that while a PRM, or roadmap, is specifically described, other planning graphs may be used. The collision detection workflow involves four stages. First, a PRM of sufficient robustness is built during the programming stage. Next, the PRM is exhaustively collision-checked in a discretized view of the environment. During the motion planning module's programming phase, the precompute data is sent to the collision detection module (e.g., the collision detection module 310) and stored in an easily-accessible manner. During real-time (i.e., live), the collision detection module streams in the obstacle information and flags edges that are in collision. The general architecture is described above and illustrated in FIG. 3.

The PRM is built in a space that contains no variable obstacles. Any a priori knowledge about the scenario can be leveraged by including fixed objects such as walls or tables, but otherwise PRM construction occurs in an obstacle-free environment. The PRM is made large enough to be robust to the obstacles expected. The architecture is agnostic to the manner in which the PRM is constructed. In this embodiment, a large graph (on the order of hundreds of thousands of edges) is tested against thousands of sample environments that are randomly generated from a parameterized representation of the scenario of interest. Useful and critical edges are retained, while edges that are infrequently used in solutions are pruned. This heuristic process is repeated several times, at each step to ensure that the PRM retains a high success rate and does not suffer path quality degradation. While this is a much more time consuming task than constructing a PRM for a single environment, this step only needs to be performed once.

Some amount of collision detection can be performed during the preprogramming stage. Geometric testing can be performed during this stage to save time during runtime. The below example illustrates collision detection using voxels to represent obstacles. It should be understood that other obstacle representations may be used. The environment can be discretized into 3D regions of voxels. Then, all possible collisions between the swept volume of every motion in the PRM and the voxels in the discretized space are precomputed.

After this step, each motion has a corresponding set of voxels with which it collides. The perception system now needs to only produce the occupancy grid (e.g., cost grid in the autonomous vehicle embodiment) that represents which regions of space in the discretized environment are occupied by obstacles, and then for each motion, check if any of the obstacle voxels are in its set of collision voxels. For all those motions for which this occurs, the corresponding edges must be temporarily removed from the PRM until the environment changes. It should be noted that the precomputed collision data and PRM are specific to a given robot and use case. If the robot changes or if the scenario drastically changes, the PRM and therefore the collision data must be recalculated. These structures will be stored in configuration files. Various configuration files that are relevant to different robot/planning graph combinations can be stored. Upon switching to a new combination, the device can be reprogrammed. In between queries for the same use-case (for example, if only the obstacles or goal change position), then reprogramming is not necessary. A soft-reset restores edges that were flagged as in-collision and the next query can begin immediately. A same scenario does not require reprogramming even where the environment may have some changes.

Once the voxel sets described above have been logically created, an architecture can be created that can rapidly query the sets at runtime. As part of the reconfigurability feature, during the programming stage, the user sends a planning graph (e.g., the PRM) and the precomputed collision data to the collision detection module 310. Each motion in the PRM is assigned to an edge module that is basically a "templated" sum of products. Rather than hardcoded logic functions, the individual edge modules contain storage mechanism (e.g., latches, capacitor, magnetic tunnel junction devices, etc.) to enable any set of voxels to be checked. To achieve parallelism and make the collision checking latency independent of the number of edges, there is a large quantity of these programmable edge modules, one for each motion in the PRM.

During this programming stage, each voxel that each motion collides with is sent to the motion planning module hardware, and the voxels are stored in the appropriate edge modules.

Figure 4:
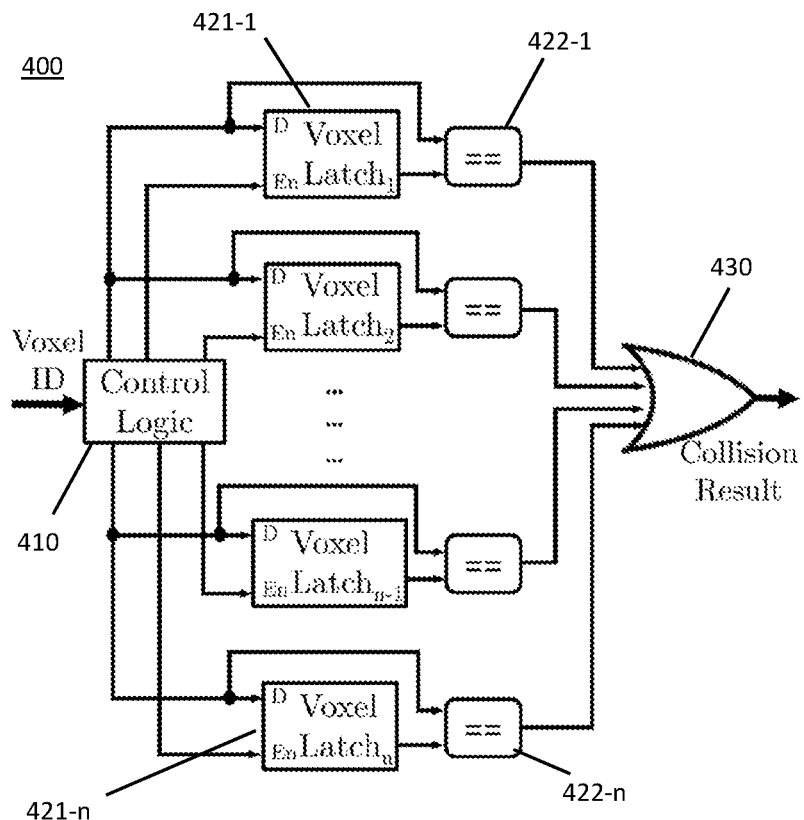
FIG. 4 shows an example reconfigurable collision detection architecture for a single motion.

FIG. 4 shows an example reconfigurable collision detection architecture for a single motion. This architecture implements a single edge. Referring to FIG. 4, a reconfigurable detection architecture 400 for a single motion includes control logic 410, parallel "edge modules" of storage mechanisms (421-1, . . . 421-$n$) and comparators (422-1, . . . 422-$n$), and a NOR logic gate 430 to OR the outputs of the parallel lines and output a collision result.

Although a latch is shown as the storage mechanism for the individual edge modules, as mentioned above, any suitable storage mechanism may be used.

During the runtime stage, the collision detector module (e.g., collision detection module 310 implemented using edge module of FIG. 4) streams in voxel IDs and distributes them to all the individual edge modules. Each edge module compares that voxel ID against all of its stored data, and outputs true if there is any match, which means that specific edge is in collision. The collision detector module aggregates the results from the edge module and outputs a bit vector representing motions in the currently programmed PRM that are in collision.

Several challenges can arise as the result of the reconfigurability. Each motion collides with a different volume of space and thus a different number of voxels. This can be a problem when implementing a programmable circuit, since modules must be made large enough to accommodate edges of various sizes. Hardware efficiency can be achieved by creating variable-sized programmable collision detection circuits based on the number of voxels with which they collide. The programming stage then involves a strategic mapping of edges in the PRM to appropriate collision detection circuits based on the number of voxels with which they collide.

Another challenge that can arise is the large amount of hardware required. Two main factors cause this strategy of reconfigurability to require more hardware resources than a hardcoded design. The state needed to store the collision data (and achieve reconfigurability) is significant. If a motion collides with 1,000 voxels, and each voxel is represented with 15 bits, then that single edge consumes 15,000 bits of state, which can be quite costly even when using simple latches as the storage mechanism. The second factor is the inability to use logic minimizers to reduce the size of the circuits, as can be done when working with hardcoded logical expressions. There is a significant amount of redundancy in the expressions both within individual edges and between edges that have overlapping swept volumes. If building a specialized circuit, this redundancy can be exploited to drastically reduce the complexity of the logical expression and reduce the hardware resources its implementation requires. These savings are lost in the reconfigurable case, even though redundancy is still present.

The voxel-latch strategy allows arbitrary combinations of voxels to form the swept volume of an edge. In practice, the voxels of a swept volume are connected and form continuous volumes. The fact that there is order present in the description of a swept volume implies that there should be ways to compress the data. An alternative to explicitly storing a representation of each individual voxel included in a swept volume could be to store representations of continuous voxels present. Rectangular prisms (for convenience, referred to as "boxes") can be represented with only the coordinates of a pair of opposite corners of the box. This can achieve large savings because the state required to store a box is equivalent to the state needed to store two voxels. Each box must only cover more than two of the original voxels to reduce state.

In order to make use of a box-based representation instead of individual voxels, a collection of boxes must be found that includes all of the original voxels. This can be considered analogous to the set cover optimization problem. In the set cover problem, there is a set of elements called the "universe" and a collection of subsets of the universe. The optimization version of the problem involves finding the minimum number of subsets whose union equals the universe. In this application, the swept volume is the universe, and the collection of subsets includes all possible rectangular prisms that overlap with this swept volume. The minimum number of boxes needed to cover the swept volume in order to reduce the state required by the design must be found. The set cover optimization problem is NP-hard, so an approximate solution must be calculated. First, a box is selected which covers the largest number of voxels in a discretized version of the swept volume without including any extraneous voxels. The covered voxels are removed from the universe (covered voxels become 'don't cares' in subsequent iterations, since boxes can overlap), and recurse until all of the voxels from the original set are covered. As an experimental example, this strategy was implemented on a PRM with 50,000 edges. It was found that for a 15-bit resolution, each swept volume collides with a mean of 2,000 voxels. The approximate solution to this version of the set-cover problem required a mean of 127 boxes to perfectly cover the swept volume (no extra volumes included).

Interestingly, if the perfect cover requirement is relaxed and it is acceptable for the box representation to include some number of voxels that were not present in the original swept volume, the number of boxes needed can decrease significantly. The problem now has multiple axes to consider. As a hard constraint, at least the original swept volume must be covered. Under that constraint, both the number of boxes required to achieve this cover while balancing the number of extra voxels included, is minimized. Another step is implemented to the algorithm to incorporate this optimization. After the set-cover described above, the result is run through a series of merges. At each iteration, the algorithm chooses the two boxes which, when merged, results in the smallest additional volume added to the set. The efficacy of this algorithm is discussed in more detail below. Being able to store representations of boxes as opposed to individual voxels is only useful if the hardware to check for membership in a box is sufficiently simple to justify this change. Logically, checking if a voxel lies within a box consists of six comparisons. If the vertex of the box closest to the origin is $(x_1;y_1;z_1)$ and the vertex of the box furthest from the origin is $(x_2;y_2;z_2)$, then checking if the voxel located at $(v_x;v_y;v_z)$ is within the box is checking that the following inequalities hold:

$$x_1 \leq v_x \leq x_2; y_1 \leq v_y \leq y_2; z_1 \leq v_z \leq z_2.$$

This task can be accomplished in one cycle with six comparators in parallel, or fewer comparators can be multiplexed to use less area.

FIG. 5 shows an example collision detection architecture for a strategy using boxes instead of voxels. Here, a single box is illustrated. Referring to FIG. 5, a reconfigurable detection architecture 500 can include control logic 510, parallel modules of storage mechanisms (521-1, ... 521-*n*) and comparators (522-1, ... 522-*n*), and an AND logic gate 530 to AND the outputs of the parallel modules and output a collision result. As with the example shown in FIG. 4, the box strategy approach can use any suitable storage mechanism (although latches are shown in the figure).

The module for each motion is the logical OR of many of such boxes. In FIG. 5, it can be seen the simplicity of a design using boxes rather than voxels. During programming, the coordinates of opposite corners are latched. At runtime, incoming voxels are compared against the saved values representing the corners of the box to see if the voxels fall within the box (e.g., incoming voxels are compared against the saved values, and the results ANDed).

FIGS. 6A-6D illustrate how the representation of the swept volume for a single motion in a PRM changes with representation strategies. FIG. 6A shows the actual swept volume. FIG. 6B includes all the individual voxels for the motion. If a hard-coded circuit is constructed specifically for this swept volume, the motion consumes around 10,000 transistors. If designing a programmable circuit that represents each voxel explicitly as described above, it requires over 660,000 transistors, an increase of over 65×. FIG. 6C shows the same swept volume described using 87 boxes instead of individual voxels. The necessary structures for this strategy consume just under 200,000 transistors. This results in less than a 4× increase over the hardcoded circuit.

The output of the aggregated results of the edge modules can be used to assign cost or remove edges from the PRM. Once collision detection (and removal or assignment of cost to edges of the PRM) has completed, a graph search is performed on the PRM to determine connectedness and construct a path. Although graph search is not the bottleneck in conventional motion planning algorithms, it can be the limiting factor if collision detection is accelerated. A challenge in designing a programmable architecture to accelerate graph processing is to achieve a design that can handle any expected graph topology yet have reasonable resource requirements. Advantageously, the described PRM is statically constructed ahead of time that can guarantee certain properties such as its maximum degree, maximum edge weight, and maximum path cost. Being able to bound these quantities enables a design of much more compact and efficient storage structures and datapaths than if arbitrary graphs were allowed. In the illustrated example, a dataflow architecture is designed to perform the Bellman-Ford algorithm. However, other shortest path algorithms could be modified to be embodied in hardware where the circuitry includes support to identify logical neighbor despite not being physical neighbors.

FIG. 7 shows a basic microarchitectural layout of the Bellman Ford Compute Unit according to an example implementation. The overarching architecture involves an array of nodes formed of the Bellman-Ford Compute Units (BFCUs) and connected via a low-cost interconnection network used to achieve reconfigurable topologies. FIG. 8 shows an example router microarchitecture for an on-chip network for the example implementation; and FIG. 9 shows a plan view of an interconnection network. Operation of the path search architecture falls into three phases. A preprocessing phase involves creating a mapping from the logical graph to the physical hardware resources. The programming phase configures the data structures of the architecture with the necessary information about the graph at hand. During the runtime phase, the distributed Bellman-Ford algorithm runs to calculate the shortest path.

The Bellman-Ford algorithm is a single source shortest path algorithm. First, all nodes except the source are initialized to a cost of infinity. At each iteration, every node checks each neighbor for a better shortest path, by adding the neighbor's current cost to the neighbor's edge weight. This algorithm is commonly used in a distributed manner to implement the Routing Information Protocol, with the difference that whole routing tables are communicated, not just neighbor costs.

A dataflow architecture that implements the Bellman-Ford algorithm is desired to avoid costly memory accesses. This architecture would be simple to design for a specific graph (or lattice, in the autonomous vehicle embodiment), but its complexity grows with the need to be reprogrammable.

Every logical node in the graph is statically assigned to a physical BFCU on the motion planning hardware module. During a programming phase, several tables in the BFCU are populated. The physical addresses of each of the node's logical neighbors are stored in a table. The edge weights to each of these neighbors are stored in another table. These tables must be filled only once and can be reused until switching to a different graph.

Each BFCU also has a register storing its current best cost to the destination (in this application, Bellman-Ford is treated as a single destination rather than a single source algorithm). These registers are all initialized to a maximum value which represents infinity. To start the shortest path search, the BFCU to which the destination node was mapped is updated to a cost of zero. The destination node then iterates over its neighbor table, and sends to each neighbor a message with its cost (zero) added to that neighbor's edge weight. When the neighbor receives this message, it compares this new cost with its current cost. If the new cost is less than its current cost, then several things happen. First, the node updates its best cost register as well as its next hop pointer. Second, it begins iterating over its own neighbor table to find the physical addresses of its neighbors, and sends each of them a message with its cost added to that neighbor's edge weight.

The decision to send values post-addition instead of pre-addition may seem incidental, but it is important. Receiving a post-addition value allows the node to evaluate whether to process or discard the message in a single cycle, rather than waiting a cycle to access the table with neighbor weights, doing an addition, and then comparing (this would require additional state to save messages arriving during the table lookup). Even though processing a new best cost and iterating over the neighbor table takes several cycles, each BFCU can maintain a throughput of one message each cycle. If the BFCU is in the process of walking through the table to send updates when it receives a new cost update message, there are two possibilities. If the new cost is an improvement, then the as-of-yet unsent messages on this table walk are stale, so the iteration can be aborted and restarted with the new cost. If the new cost is not an improvement, the message is discarded. The uninterrupted ability to handle a message in each cycle eliminates the need for input buffers in the compute node and means the network can count on being able to eject a message at each node every clock cycle, which will be important when discussing the interconnection network.

Aside from cost update messages, the BFCUs handle two other types of messages as well. If the BFCU receives a next hop query, it responds with the address of the neighbor from which it received its best cost. This class of message allows the path itself to be extracted. The BFCU can also receive a best cost query, to which it responds with the current value of its best cost register.

Even though the behavior of the BFCU is simple, several design choices must be made to keep the size of the BFCU small enough that the architecture can scale to large graph sizes. If each node is allowed to have an unbounded number of logical neighbors, for example, the neighbor address table would need to be large. The strategy involves precomputing a planning graph, so each node can be guaranteed to have at most four neighbors without affecting the quality of the planning graph. This limitation can be overcome if necessary by logically splitting a node with too many neighbors into multiple nodes connected with an edge weight of zero. Similar decisions must be made with maximum path and edge cost.

Distributed Bellman-Ford algorithms often implement a split-horizon advertisement policy to allow the network to more effectively deal with failed links. In the present architecture, collisions (which are effectively failed links in the planning graph) are communicated before graph search begins, removing the need to keep a split horizon for that reason. Advertising a more costly route back to a node's next hop still unnecessarily occupies network bandwidth. However, simulations show these redundant messages have a negligible impact on performance (less than 1% increase in path search completion time). Complexity is kept down by not implementing a split horizon.

These decisions all help keep the area footprint of each BFCU quite small. Each node requires around 6,000 transistors. Of this, 70% is comprised of programmable state, while the rest is combinational logic. This modest size makes it feasible to implement the number of compute nodes needed to solve challenging problems.

In order to achieve a Bellman-Ford implementation, each BFCU needs to be able to communicate with its logical neighbors. However, because the design must be reconfigurable, this communication must happen over a network so that the sea of physical BFCUs can emulate the behavior of the desired graph topology. The network enables the BFCU to abstract away communication issues and behave as if it is actually connected to its logical neighbors, even though they may not be physically adjacent.

This network must also be efficient both in space and power since a useful design will have thousands of nodes. The proposed microarchitecture emphasizes simplicity as a first-class constraint to enable scaling to large network sizes. Simplifying, or optimizing the network, can occur in several ways. The first is that because inter-BFCU messages are very small, each message can be composed as single flit. Since each message is a single flit, multiple flits rarely travel back-to-back. This allows performance to be maintained with only a single buffer entry at each port, since credit return latency does not need to be covered. Each output direction of the router has a single associated credit. The credit starts at 1 and is decremented when sending a message in that direction. The credit is returned out of band directly from the neighboring router once that message has vacated the buffer entry in the neighbor. Implementing this single buffer entry scheme reduces the area by 40%.

Upon further examination, the intermediate turning buffer also appeared to be underutilized. Instead of helping throughput by freeing resources in the East/West direction, it was simply introducing a turning penalty without benefit. Performance was virtually unchanged when removing the turning buffer entirely. This is partly because of the low traffic the distributed Bellman-Ford algorithm creates, and because the BFCUs can service a message every cycle, so a message very rarely stalls in an input buffer waiting to be ejected (only if two messages arrive for the same node simultaneously). This optimization enabled a further reduction in the size of the router by directly connecting the East and West input buffers to the North/South/Ejection muxes.

Additionally, the properties of our distributed Bellman Ford algorithm avoid implementing any starvation avoidance protocol, as is typically required with this router. Because new messages in this network are only generated as the algorithm progresses (when better costs are received), a stall at any location in the network is algorithmically guaranteed to eventually cause the rest of the network to quiesce. The quiescence frees up whatever resources are needed for the messages to continue. Simulations show that these stalls are extremely rare. The design of the router architecture shown in FIG. 8 consumes 7,500 transistors. Approximately 65% of this is the four single-entry input buffers, which shows the importance of reducing the buffer demands of each individual router.

One goal of the proposed design of the reconfigurable network is the ability to achieve good performance with a wide variety of networks. In order to accomplish this, smart mapping of the logical planning graph configurations to physical BFCUs must occur. To minimize communication latency, logical neighbors are ideally mapped to physically neighboring BFCUs, but this is not always possible due to the planning graph's topology. The physical network of BFCUs is a 2D mesh, while it is unlikely the logical planning graph is planar given that it is created in the high-dimensional configuration space of the robot.

A simulated annealing approach was used to obtain an acceptable solution to this mapping problem during a preprocessing phase. Simulated annealing is a classic technique to search for the optimum of a complicated state space. First, the logical nodes are randomly assigned to locations on the physical mesh. The system is initialized with a certain "temperature" and cooling rate. At each iteration, the system attempts to transition into a neighbor state. Neighbor states are generated by randomly selecting a node (node A). One of node A's logical neighbors (node B) is chosen, and a physical location is randomly selected in the neighboring vicinity of node B. The neighbor state is constructed by swapping node A with whatever logical node is currently mapped to this location. If this new state decreases the system's energy (in the present application, defined as the mean physical distance between logical neighbors), it is accepted. If it increases the systems energy, it is accepted with a probability that depends on the current temperature of the system. The higher the temperature, the more likely the system will accept higher energy neighbor states. Accepting higher energy states allows the algorithm to find its way out of local minima. Each iteration, the temperature decreases exponentially at the cooling rate.

The interface between the shortest path architecture and the collision detection architecture occurs at points on an interconnection network. These points can be referred to as "control nodes". FIG. 9 shows the control nodes located on the perimeter of the interconnection network. The collision detection modules send a bit vector representing which motions (graph edges) are in collision to the control nodes. For each motion in collision, the control nodes send messages to the BFCUs assigned to the nodes on either side of the edge, indicating that the BFCU should not use that edge for the next query. The control nodes are also responsible for collecting the path itself upon completion. To this end, parameters are set (during the programming phase) to direct the control nodes how to assess the status of the shortest path search. These include the number of cycles to wait before starting to probe the source node's best cost, as well as the conditions that indicate completion. These conditions can be determined with static analysis, as will be discussed more below. The size of the control nodes is dominated by the storage required to hold the mapping of edge ID to physical addresses of the involved configurations. This mapping enables the control nodes to forward the collision detection results to the appropriate places on the network. If a 128× 128 mesh is implemented, then each control node consumes almost 190,000 transistors, almost all of which is the mapping table.

For this example implementation, the pick-and-place task is evaluated since it is ubiquitous in robotics. PRMs were generated of various sizes for the six degree-of freedom Jaco II robotic arm made by Kinova. Experiments were performed on sampled environments consisting of randomly placed and sized obstacles and different source/destination pairs. The behavior of the systems solving problems for PRMs ranging from 4,000 to 256,000 edges were tested, but the area and timing numbers will focus on a 128×128 implementation solving problems for a 16,000 node, 32,000 edge PRMs. This size is sufficient to solve challenging problems in the robotics space.

The Synopsys toolchain and the NanGate 15 nm Open Cell Library were used to synthesize the design and obtain performance, area, and power estimates. The following numbers are for an implementation with 16,384 nodes (128×128). Area is given in terms of transistor count, which should be independent of technology node, but the latency and power estimates are dependent on this aggressive feature size.

Since the collision detection architecture is completely parallel with respect to the edges in the planning graph that is used, its latency depends solely on the number of obstacle voxels it must process. For the random pick-and-place environments sampled in this experiment, there was an average of 750 obstacle voxels, which means collision checking takes an average of 750 cycles, since each voxel requires only a single cycle to process.

To test the effectiveness of the proposed shortest path architecture, a cycle-accurate simulator was written for the interconnection network and the associated BFCUs. Although Verilog was used for the design and an RTL simulator was used to test functional correctness on smaller implementations, running thousands of timing experiments for a 16,384 node implementation in an RTL simulator is time-prohibitive. The simulator is a quick exploration of the design space while developing the microarchitecture as well as efficiently profiling the final result.

Figure 10:
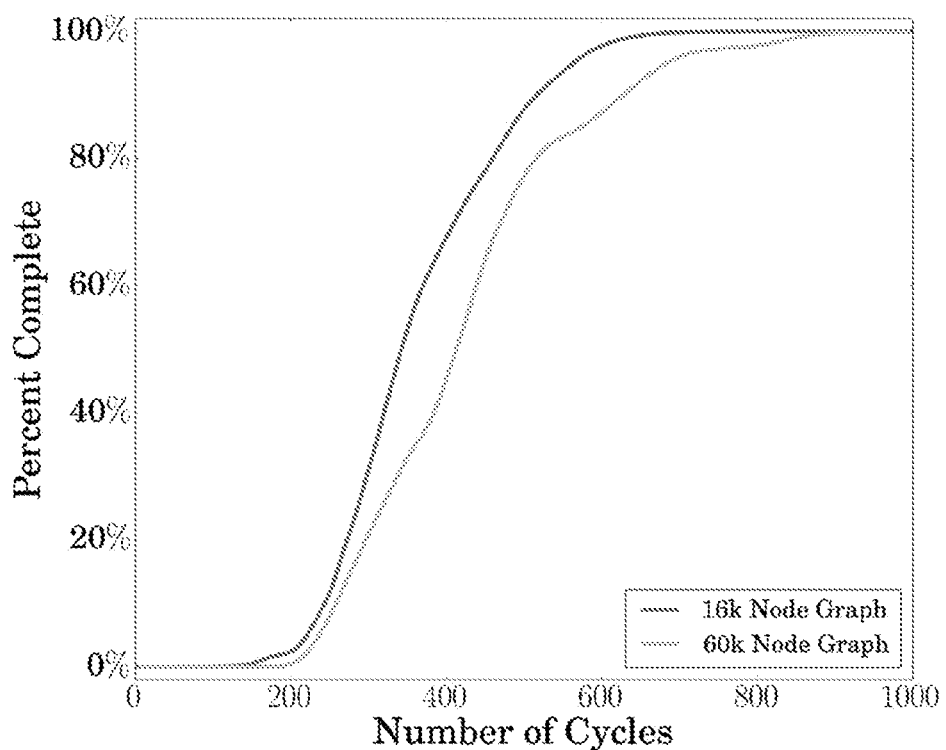
FIG. 10 shows the probability of completion at various times for two sizes of roadmap, simulated over 5,000 sampled environments.

For the 16,000 node graph, the mean time to completion is 360 cycles. In addition to the speed of the graph search itself, one aspect of design that must be evaluated is the method of detecting search completion. FIG. 10 shows the probability of completion at various times for two sizes of roadmap, simulated over 5,000 sampled environments. Static analysis of the data was used to select parameters and to configure the path extraction module during the programming phase to identify completion. For the 16,000 node graph, the strategy correctly identifies completion over 99% of the time. This comes at an average overhead of 270 extra cycles.

This method is acceptable because while it is not strictly guaranteed that the path search will have completed running when the path is retrieved, it will never return an invalid path, just a sub-optimal path. If parameters are chosen properly this should rarely happen, but if this is not appropriate for certain applications, the algorithm is guaranteed to quiesce at a rate bounded by the number of nodes in the graph, and a more conservative parameter setting can be used.

Summing the time to both complete path search and detect completion with high accuracy yields a mean of 630 cycles. However, as is common in hardware design, moving data around takes just as much time as the computation. There is additional overhead of 950 cycles to communicate collisions to the BFCUs and actually extract the path. Including the time to perform collision detection, the total average latency is 2,330 cycles from the time the obstacle voxels arrive, to the time a path is ready for output. Synthesis in Synopsys indicates the design could easily be clocked at 1 GHz, so this translates to a 2.3 microsecond latency. This latency is roughly five orders of magnitude faster than conventional sampling-based planners, and two orders of magnitude faster than previous proposed accelerators.

In total, a 16,384 node design consumes around 2.3 billion transistors. The majority of space is taken up by the collision detection modules, even with the simplified box representations. The next largest components are the network nodes, which are dominated by the four single-entry buffers. Synopsys estimates the power consumption of the design to be 35 watts. Similar to the area numbers, the majority of this is from the collision detection modules, and the rest from the network.

Figure 11A:
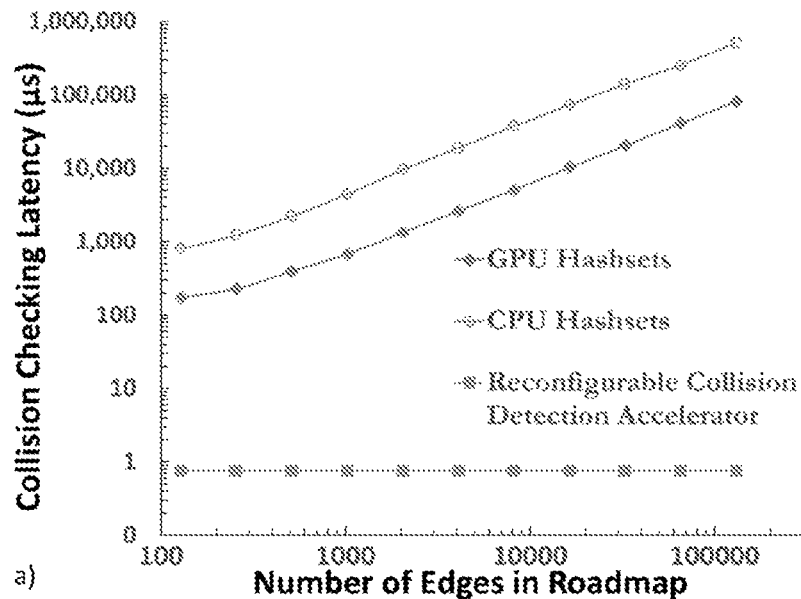
FIG. 11A shows a plot of number collision checking latency to the number of edges in a roadmap.
Figure 11B:
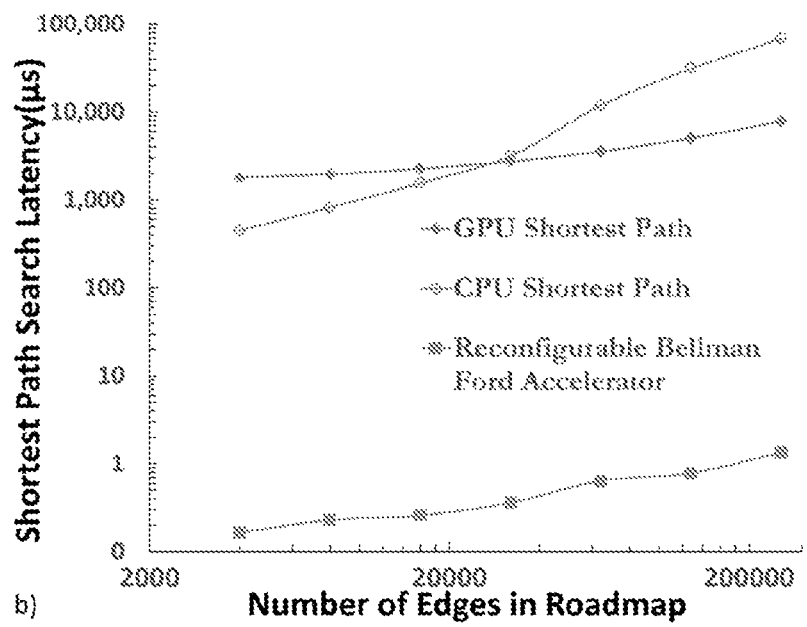
FIG. 11B shows a plot of shortest path search latency to the number of edges in a roadmap.

FIG. 11A shows a plot of collision checking latency to the number of edges in a roadmap; and FIG. 11B shows a plot of shortest path search latency to the number of edges in a roadmap. It is also important to consider how the performance scales relative to problem size. FIG. 11A shows that the time to perform collision detection is independent of the number of edges in the PRM because there is dedicated hardware for each edge. The 16,384 node implementation can handle up to 32,768 edges, but the design is easily scalable to larger implementations. FIG. 11A also helps deconstruct how much of the benefit is derived from the aggressive precomputation compared to the dedicated hardware by showing strategies exploiting the same precomputation implemented on a CPU and GPU. The CPU version is a highly optimized C program running on a 4-core Haswell i7 with 8 GB of RAM, and is instrumented with OpenMP directives to take advantage of all hardware threads. The GPU version is a well-tuned CUDA kernel running on a Tesla K80. Both of these strategies achieve roughly a 10× speedup compared to running a conventional sampling-based planner at runtime, but are still much slower than the proposed solution.

FIG. 11B shows the scaling behavior of the proposed reconfigurable Bellman-Ford hardware-based shortest path algorithm and illustrates the need for this custom hardware solution. Having dedicated hardware for each node allows the performance to scale linearly with the average number of hops through the graph. Along with the proposed custom hardware solution the performance of the shortest path search on a CPU and GPU is also shown. The CPU is a 4-core Haswell i7 running the shortest path implementation in Klampt, a well-optimized robotics software package. The GPU is running shortest path using the nvGraph graph analytics API on a Tesla K80. Because the proposed architecture involves tightly coupling the shortest path with collision detection, while the GPU involves communication over PCI-e, no data movement overhead was included for either implementation to be fair (so this figure is strictly concerned with compute time). Even so, the compute time for the GPU is actually slower than the CPU for small graph sizes, crosses over around 32,000 edges, and remains several orders of magnitude slower than the proposed solution presented herein. This demonstrates that in order to bring the latency of shortest path to the same order of magnitude as accelerated collision detection, a custom hardware solution is needed.

There are several aspects of the boxification strategy for performing collision detection that must be evaluated. The first is the technique of aggressively reducing the number of boxes in the swept volume representation in the pursuit of reduced hardware cost. Using the algorithm described above for boxified collision detection, a sweep of the parameter space on a 50,000 edge roadmap was performed to evaluate the tradeoff between the hardware budget and the increase in volume of the representation.

Figure 12:
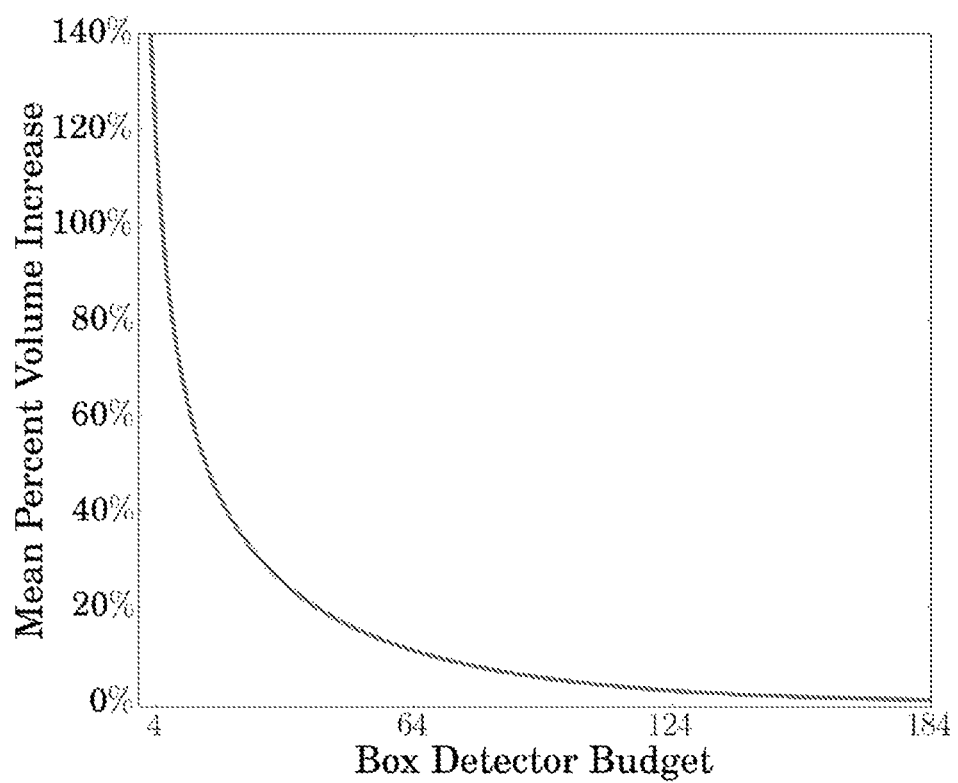
FIG. 12 shows a visualization of the tradeoff between the hardware budget and the increase in volume of the representation.

FIG. 12 shows a visualization of the tradeoff between the hardware budget and the increase in volume of the representation. The average number of boxes to exactly represent the original voxelized volume is 127. However, using the algorithm described above, with a box budget of only 64, the average volume of each representation increases by just 11%. It is important to note that this optimization is safe, since volume is only added, never removed, so a colliding motion will never erroneously be flagged as available. Given that the size of each box representation is equivalent to two voxels, it is clear that representing volumes with boxes is vastly more efficient than with voxels. Another question is how often this more coarse representation causes a degradation in the ability of the architecture to find optimal paths. A 50,000 edge PRM was tested against 5,000 sampled pick-and-place environments using both an individual voxel representation and a boxification strategy that allowed a 10% increase in volume. Allowing the 10% increase in volume caused an increase in failure rate of only 0.13%. Of the remaining paths, the average path length increased by 0.59%. This small penalty is more than offset by the 50% decrease in hardware cost compared to a perfect cover using boxes. These results show that the strategy of performing collision detection with box representations effectively reduces the hardware resources required as well as maintains path quality.

What is claimed is:

1. A system for motion planning for autonomous vehicles, the system comprising:
a plurality of sensors;
a plurality of detectors in electrical communication with the plurality of sensors; and
a motion planning module in electrical communication with the plurality of detectors and in electrical communication with a computing system of an autonomous vehicle;
wherein the motion planning module stores a planning graph comprising a plurality of nodes connected by edges, wherein each node represents, implicitly or explicitly, time and variables defining a state of the autonomous vehicle, an operating environment, or both the state of the autonomous vehicle and the operating environment, and the motion planning module receives perception data and sample trajectories, adjusts a respective representation of a probability of collision along each edge in the planning graph that results in a collision with obstacles as represented in the perception data to account for the sample trajectories, determines a path considering cost and probability of collision, and outputs the path to the computing system.

2. The system of claim 1, wherein the plurality of detectors comprises an object tracker that identifies a dynamic object in an environment and outputs a probability distribution of future trajectories for the dynamic object to be sampled by the motion planning module.

3. The system of claim 1, wherein the plurality of detectors comprises an object detector that generates perception data that represents objects of an environment.

4. The system of claim 1, wherein the motion planning module comprises a hardware processor, memory storage, and a plurality of collision detection units, each collision detection unit representing a respective one of the edges of the planning graph.

5. The system of claim 1, wherein the motion planning module comprises a reconfigurable architecture.

6. A system for motion planning for autonomous vehicles, the system comprising:
a plurality of sensors;
a plurality of detectors in electrical communication with the plurality of sensors; and
a motion planning module in electrical communication with the plurality of detectors and in electrical communication with a computing system of an autonomous vehicle;
wherein the motion planning module stores a planning graph comprising a plurality of nodes connected by edges, wherein each node represents, implicitly or explicitly, time and variables defining a state of the autonomous vehicle, an operating environment, or both the state of the autonomous vehicle and the operating environment, and the motion planning module receives perception data and sample trajectories, adjusts a respective representation of a probability of collision along each edge in the planning graph that results in a collision with obstacles as represented in the perception data to account for the sample trajectories, determines a path considering cost and probability of collision, and outputs the path to the computing system, wherein the motion planning module comprises:
a hardware processor;
memory storage, wherein the planning graph is stored at the memory storage; and
precomputed collision data stored at the memory storage such that during runtime, as perception data is received, the hardware processor compares the perception data to the precomputed collision data stored in the memory storage to determine collisions.

7. The system of claim 6, wherein the precomputed collision data is updated with new precomputed collision data for a new autonomous vehicle or scenario.

8. A motion planning device comprising:
a hardware processor;
memory storage; and
a planning graph stored in the memory storage, the planning graph comprising a plurality of nodes connected by edges, wherein each node represents, implicitly or explicitly, time and variables defining a state of an autonomous vehicle, an operating environment, or both the state of the autonomous vehicle and the operating environment,
wherein the hardware processor receives representations of obstacles that represent objects of an environment and sample trajectories of at least one of the obstacles in the environment that is a dynamic object; adjusts a respective representation of a probability of collision along each edge in the planning graph that results in a collision with the representation of the obstacles to account for the sample trajectories; and determines a path considering cost and probability of collision.

9. The motion planning device of claim 8, wherein the planning graph comprises at least one channel stored associated with the edges.

10. The motion planning device of claim 9, wherein the at least one channel comprises cost.

11. The motion planning device of claim 9, wherein the at least one channel comprises risk.

12. The motion planning device of claim 8, further comprising a plurality of collision detection units, wherein each of the detection units identify collisions between the representations of the obstacles and a respective one of the edges of the planning graph.

13. A method of performing motion planning for an autonomous vehicle comprising:
receiving a representation of obstacles representing objects of an environment;
sampling trajectories of any of the obstacles in the environment that represent dynamic objects of the environment;
for each edge in a planning graph that results in a collision with the representations of obstacles, adjusting a respective cost value to account for a probability of collision based on the sample trajectories, wherein the planning graph comprises a plurality of nodes connected by edges, wherein each node represents, implicitly or explicitly, time and variables defining a state of the autonomous vehicle, an operating environment, or both the state of the autonomous vehicle and the operating environment; and determining a path that considers cost and/or risk.

14. The method of claim 13, further comprising:
receiving assigned cost values that represent a respective assigned cost which is independent of a probability of a collision; and
for each edge in the planning graph that results in a collision with one or more voxels of the representation of the obstacles, adjusting the respective cost value for the edge to account for the assigned cost values.

15. The method of claim 14, wherein determining the path comprises:
determining an effective cost between the probability of collision for an identified dynamic object and the assigned cost value of collision for an identified object.

16. The method of claim 14, wherein determining the path comprises computing a motion plan using the assigned cost values of collision, the path identifying a path with a lowest cost subject to application of a risk constraint with respect to the probabilities of collision for that path.

17. The method of claim 13, wherein the method is repeated after each movement of the autonomous vehicle.

18. A method of operating a reconfigurable motion planning module, the method comprising:
performing a first programming phase to configure a motion planning module for a particular autonomous vehicle and optionally a particular scenario, the first programming phase comprising:
receiving a first planning graph; and
for each edge of the first planning graph, receiving precomputed collision data for, and cost associated with, that edge;
storing the first planning graph and the precomputed collision data at a memory storage of the motion planning module;
performing real-time motion planning using the motion planning module configured for the particular autonomous vehicle and optionally the particular scenario; and
performing a second programming phase to configure the motion planning module for a new particular autonomous vehicle, a new particular scenario, or both a new particular autonomous vehicle and new particular scenario, the second programming phase comprising:
receiving a second planning graph; and for each edge of the second planning graph, receiving precomputed collision data for, and cost associated with, that edge; and
storing the second planning graph and the precomputed collision data at the memory storage of the motion planning module.

19. The method of claim 18, wherein performing real-time motion planning using the motion planning module configured for the particular autonomous vehicle and optionally the particular scenario comprises:
receiving perception data;
comparing the perception data to the precomputed collision data stored in the memory storage to determine collisions; and
determining shortest path, optionally considering cost.

20. The method of claim 18, wherein the first programming phase further comprises:
programming, based on the received first planning graph, a circuitry mapping logical topologies onto a physical topology of parallel hardware units implementing a shortest path algorithm.

* * * * *